(12) United States Patent
McCarthy, III

(10) Patent No.: US 9,363,538 B2
(45) Date of Patent: *Jun. 7, 2016

(54) APPARATUS, SYSTEMS AND METHODS FOR REMOTE STORAGE OF MEDIA CONTENT EVENTS

(71) Applicant: EchoStar Technologies L.L.C., Englewood, CO (US)

(72) Inventor: Bernard A. McCarthy, III, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/075,198

(22) Filed: Nov. 8, 2013

(65) Prior Publication Data

US 2014/0082677 A1    Mar. 20, 2014

Related U.S. Application Data

(63) Continuation of application No. 13/091,952, filed on Apr. 21, 2011, now Pat. No. 8,584,178.

(51) Int. Cl.
| | |
|---|---|
| *H04N 21/218* | (2011.01) |
| *H04N 21/2743* | (2011.01) |
| *H04N 21/2747* | (2011.01) |
| *H04N 21/432* | (2011.01) |
| *H04N 21/433* | (2011.01) |
| *H04N 21/214* | (2011.01) |

(52) U.S. Cl.
CPC ..... *H04N 21/21815* (2013.01); *H04N 21/2143* (2013.01); *H04N 21/2743* (2013.01); *H04N 21/2747* (2013.01); *H04N 21/4325* (2013.01); *H04N 21/4334* (2013.01)

(58) Field of Classification Search
CPC .................. H04N 21/4325; H04N 21/2143
See application file for complete search history.

(56) References Cited

U.S. PATENT DOCUMENTS

| | | | | |
|---|---|---|---|---|
| 7,380,260 | B1 * | 5/2008 | Billmaier et al. | 725/37 |
| 8,141,117 | B1 * | 3/2012 | Coningsby et al. | 725/55 |
| 2004/0237104 | A1 | 11/2004 | Cooper et al. | |
| 2008/0022332 | A1 | 1/2008 | Barrett | |
| 2010/0319044 | A1 | 12/2010 | Agans et al. | |

OTHER PUBLICATIONS

"Network DVR," from Wikipedia, the free encyclopedia, download date of Mar. 2, 2011, 3 pages.

\* cited by examiner

*Primary Examiner* — Mark D Featherstone
(74) *Attorney, Agent, or Firm* — Lowe Graham Jones PLLC

(57) ABSTRACT

Techniques for facilitating recording of media content events by media devices on remote storage devices are described. Some embodiments provide a remote storage manager as part of a media device, such as a set-top box. In one embodiment, the remote storage manager causes a media content event to be recorded on a remote persistent storage device by receiving the media content event from a program distributor, and then transmitting the media content event to the remote persistent storage device. In another embodiment, the remote storage manager instructs the remote persistent storage device to obtain the media content event from the program distributor, so that the remote persistent storage device can record the media content event without the media content event first being received by the remote storage manager.

18 Claims, 5 Drawing Sheets

APPARATUS, SYSTEMS AND METHODS FOR REMOTE STORAGE OF MEDIA CONTENT EVENTS

PRIORITY CLAIM

This patent application is a Continuation of U.S. Non-Provisional Patent Application Ser. No. 13/091,952, filed Apr. 21, 2011, published as U.S. Publication No. 2012/0272283, entitled "APPARATUS, SYSTEMS AND METHODS FOR REMOTE STORAGE OF MEDIA CONTENT EVENTS," and issued as U.S. Pat. No. 8,584,178 on Nov. 12, 2013, the content of which is herein incorporated by reference in its entirety.

BACKGROUND

A number of approaches exist for recording media content events, such as such as television shows or movies. In one approach, a device such as a set-top box includes a hard disk or other storage device that can persistently store a received media content event. However, media content events recorded on such a set-top box may not be available to remote systems, such as mobile devices. Moreover, the additional cost of including recording capabilities in a set-top box may make such devices prohibitively expensive in some markets.

In another approach, a cable broadcaster or other program distributor may provide a "remote digital video recorder," which includes dedicated storage located at a transmission facility or otherwise remote from a customer premises. In this approach, when a user indicates a media content event to be recorded, the media content event is recorded on the dedicated storage for later retransmission to, and viewing by, the user or other viewer. However, such an approach is incapable of utilizing surplus storage capacity located on computer systems or other devices located at the customer premises.

SUMMARY

One embodiment provides a method for facilitating recording of media content events by a media device that does not itself have persistent recording capabilities. The method comprises receiving a media content event from a program distributor; causing the media content event to be recorded on a remote persistent storage device, such as by transmitting the media content event to the remote persistent storage device; and facilitating on-demand viewing of the media content event recorded on the remote persistent storage device.

In other embodiments, systems and computer-readable media having similar characteristics are provided.

BRIEF DESCRIPTION OF THE DRAWINGS

Preferred and alternative embodiments are described in detail below with reference to the following drawings.

DETAILED DESCRIPTION

Example embodiments described herein facilitate remote storage of media content events by media devices that may not themselves have recording capabilities.

Figure 1:
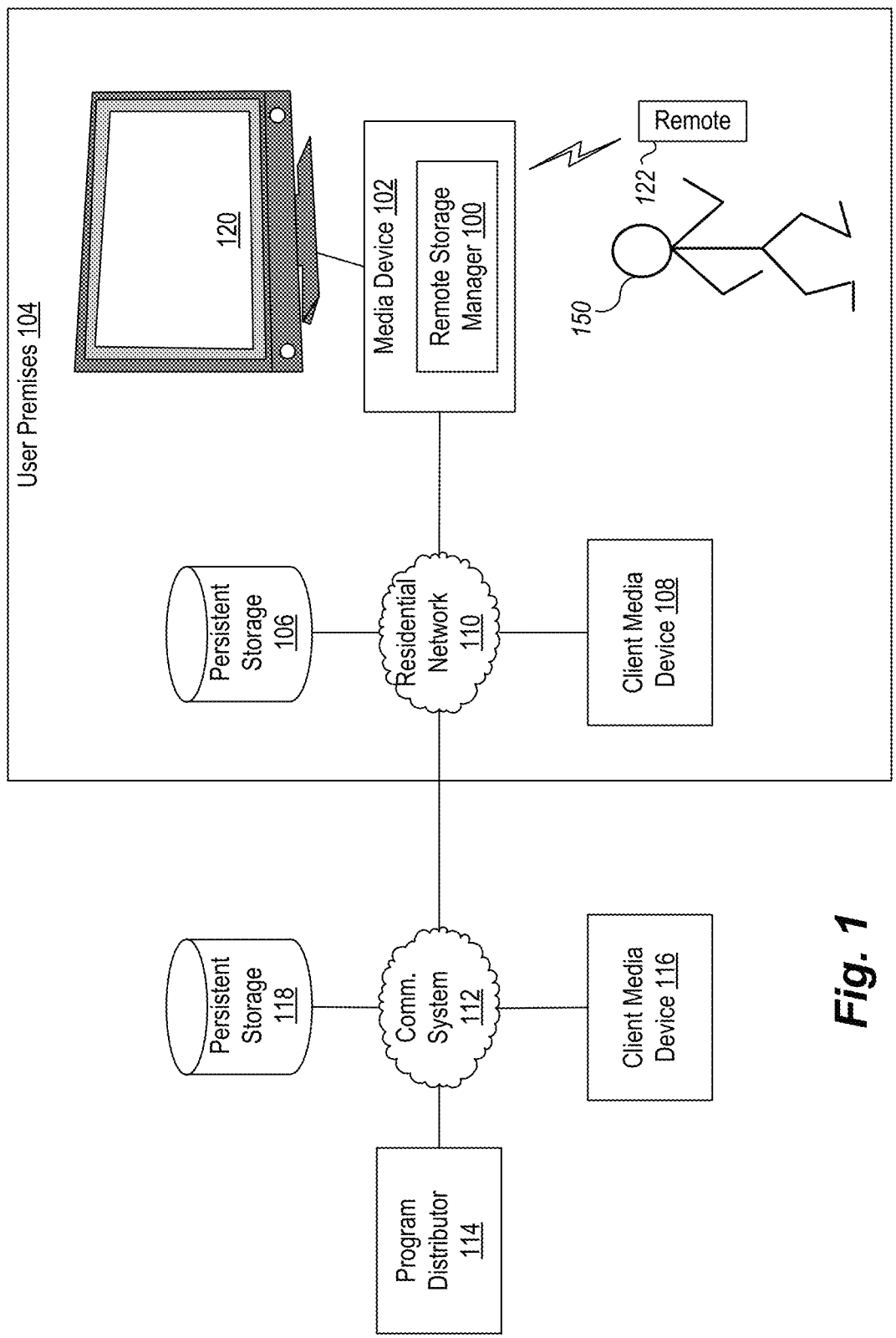
FIG. 1 is a block diagram illustrating functional elements of an example embodiment of a remote storage manager.

FIG. 1 is a block diagram illustrating functional elements of an example embodiment of a remote storage manager 100 executing as part of a media device 102 that is located at user premises 104. The user premises 104 include the media device 102, persistent storage 106, and a client media device 108, each communicatively coupled to a residential network 110. The media device 102 is also communicatively coupled to a presentation device 120. The media device 102, the client media device 108, and the persistent storage 106 are further communicatively coupled via a communications system 112 to a program distributor 114, a client media device 116, and persistent storage 118. The media device 102 receives media content events from the program distributor 114, and presents received media content events on the presentation device 120. A user (or viewer) 150 interacts with the media device 102 via a remote control device 122, such as by selecting media content events, adjusting the volume, and the like. Media content events may include movies, news programs, sporting events, serial comedies or dramas, and other program events that are communicated to the media device 102. Media content events may include video data, audio data, text, and/or computer instructions.

The remote storage manager ("RSM") 100 facilitates or manages the remote storage of media content events transmitted by the program distributor 114. In some embodiments, the media device 102 does not have resident persistent storage capacity to store media content events, such as a DVR ("Digital Video Recorder"). That is, the media device 102 may not be configured to persistently record media content events. The media device 102 may not have persistent storage capabilities because, for example, it does not include a fixed (hard) disk drive, a DVD ("Digital Video Disk") recorder, or other persistent storage device (e.g., Flash memory) that can be used to persistently record media content events. Media devices without persistent storage capabilities may be referred to as "non-persistent storage media devices." Media devices with persistent storage capabilities may also be referred to as "persistent storage media device." In such embodiments, the described techniques utilize persistent storage capabilities provided by systems or devices that are remote from the media device 102, thereby providing a number of advantages, including the appearance that the media device 102 can record media content events, lower cost/price for the media device 102 (e.g., because it need not include DVR capabilities), access to recorded media content events from devices other than the media device 102, use of surplus storage available on other computing devices located at the user premises 104, smaller size for the media device 102 (e.g., because it need not include a hard disk drive), lower power requirements for the media device 102, and the like.

In one embodiment, the RSM 100 receives an indication of a media content event provided by the program distributor 114 that the user 150 wishes to record. In response, the RSM 100 causes the media content event to be recorded on some remote storage system or device, such as persistent storage 106 or 118. Later, the RSM 100 facilitates the on-demand viewing of the media content event recorded on the remote storage device. In this manner, the RSM 100 can provide recording capabilities for media devices that are not themselves capable of recording media content events for later viewing.

The persistent storage 106 or 118 can be, include, or be part of any system or device that is capable of receiving and storing media content events via some communications link, such as may be provided by the residential network 110 and/or the communications system 112. For example, the persistent storage 106 may be provided as part of a personal computer (e.g., a desktop or laptop computer), a DVR system, a DVR capable set-top box, a network-accessible storage ("NAS") system, a mobile device (e.g., a smart phone, a tablet computer), or the like. Often, persistent storage resident on such devices is largely under-utilized, and the described techniques can put such surplus storage to beneficial use.

The persistent storage 118 may be provided as part of a network-accessible computing system, such as a cloud-based computing system accessible via a public network (e.g., the Internet) or private network. The persistent storage 118 may be virtualized such that its physical location and/or configuration are transparent to the user 150. Furthermore, the persistent storage 118 may be managed, operated, or hosted by a party or entity that is distinct from the operators of the program distributor 114.

In a first example embodiment, the RSM 100 causes media content events to be recorded on a remote persistent storage by forwarding media content events received from the program distributor 114. Initially, the user 150 may select a media content event to be recorded by the media device 102. In response, the RSM 100 causes the selected media content event to be transmitted from the program distributor 114 to the media device 102, such as by tuning to a signal that carries the selected media content event. As the selected media content event is received by the media device 102, the RSM 100 forwards (e.g., transmit, sends) the received media content event to persistent storage 106 located at the user premises 104 and/or persistent storage 118 located outside of the user premises 104.

In the first example embodiment, the RSM 100 may also translate, transform, or otherwise process media content events prior to forwarding them to persistent storage. For example, the RSM 100 may translate a media content event from a native format (e.g., in which it was received from a transmission network) into a translated format (e.g., that is optimized for viewing on a particular class of devices or for transmission over particular types or classes of network). The translated format may be selected so as to be suitable for viewing or transmission to a mobile device, such as by selecting a lower bitrate, higher compression ratio, smaller screen size, or the like. As another example, the RSM 100 may encrypt a media content event to facilitate access controls to the media content event when it is viewed at a later time. Such encryption may be performed on a media content event that was previously decrypted by the media device 102 as part of its access control functionality. In other cases, the RSM 100 forwards the encrypted media content event as received by the underlying media device 102.

In a second example embodiment, the RSM 100 causes media content events to be recorded on persistent storage devices by causing those storage devices to obtain media content events transmitted by the program distributor 114 directly without first being received by the media device 102. In response to an indication from the user 150 to record a media content event, the RSM 100 causes persistent storage 106 or 118 to receive the selected media content event from the program distributor 114. As one example, the persistent storage 106 may be a DVR capable set-top box located within the user premises 104. In this case, the RSM 100 causes the DVR capable set-top box to tune to the selected media content event at the appropriate time, and to record the media content event as it is received from the program distributor 114. As another example, the persistent storage 118 may be a cloud computing system that provides a storage facility via the Internet. In this case, the RSM 100 causes the cloud computing system to receive the selected media content event from the program distributor 114, such as by initiating a stream from the program distributor 114 to the persistent storage 118.

The RSM 100 may include logic for determining how to cause a remote persistent storage device to record a media content event. In one embodiment, the RSM 100 determines whether a remote persistent storage device is configured to receive media content events from the program distributor 114 without first passing through the media device 102. If so, the RSM 100 instructs the remote persistent storage device to obtain the media content event from the program distributor 114. In such cases the remote persistent storage device receive and store the media content event in a native format, and may later utilize the RSM 100 or some other module/system to translate the media content event into a translated format suitable for viewing on a client device, if necessary. If the remote persistent storage device is not configured to receive the media content event directly, the RSM 100 receives the media content event from the program distributor 114 and then forwards the received media content event to the remote persistent storage device. The RSM 100 may translate or otherwise process the received media content event prior to forwarding it in translated format to the remote persistent storage device.

After the RSM 100 causes a media content event to be recorded on remote persistent storage, the RSM 100 can facilitate on-demand viewing of the recorded media content event in various ways. For example, the user 150 can utilize a client media device 108 or 146 to view a media content event recorded on persistent storage 106 or 118. The user 150 can obtain information about recorded media content events by accessing an index or other information stored, provided, and/or transmitted by the RSM 100. For example, the user 150 can utilize client media device 108 executing a Web browser or other client application to browse media content events recorded on remote persistent storage as directed by the RSM 100. The RSM 100 can provide a URL ("Uniform Resource Locator") or other identifier of the remote persistent storage 106 or 118 to the client media device 108 or 146, which can then be used to access a media content event stored on the remote persistent storage 106 or 118.

The illustrated media device 102 is a set-top box ("STB"). In other embodiments, the media device 102 is or includes a television ("TV"), a digital video disk ("DVD") player, a DVD recorder, a game playing device, or a personal computer ("PC"). In some embodiments, the media device 102 includes multiple communication ports, such as a first port for receiving an RF signal (e.g., from a satellite or terrestrial broadcast system) from the program distributor 114 and a second port (e.g., Ethernet) for communicating with other systems via the Internet or other networks.

As noted, the media device 102 receives media content events from the program distributor 114 via the communications system 112. The communications system 112 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. The residential network 110 may be a local area network (e.g., an Internet Protocol network) carried over wired and/or wireless media, including twisted-pair cables, coaxial cables, fiber optics, Wi-Fi, or the like. The term "residential network" used herein does not include dedicated point-to-point transmission connections, such as a coaxial or RCA connector used to connect a DVR to a set-top box.

This described techniques are not limited to the particular architecture shown in FIG. 1. For example, all or part of the RSM 100 may reside on a computing system that is remote from the media device 102. In one embodiment, part of the RSM 100 resides at a remote computing system. For example, in cases where the media device 102 is protected by a firewall, a computing system that is accessible via the Internet may host a Web server that provides an index of media content events recorded via the RSM 100, so that a user device can access such an index from any location.

In addition, various types of program distributors 140 are contemplated, including broadcasters of digital and/or analog media content events, such as satellite broadcasters, over-the-air (terrestrial) broadcasters, cable systems, and the like. Also, the program distributor 114 may be or include interactive and on-demand systems, such as Internet video streaming or download services. Furthermore, although the examples herein are provided primarily with respect to media content events, other types of content or data formats are contemplated, including audio (e.g., music streaming, digital radio).

Figure 2:
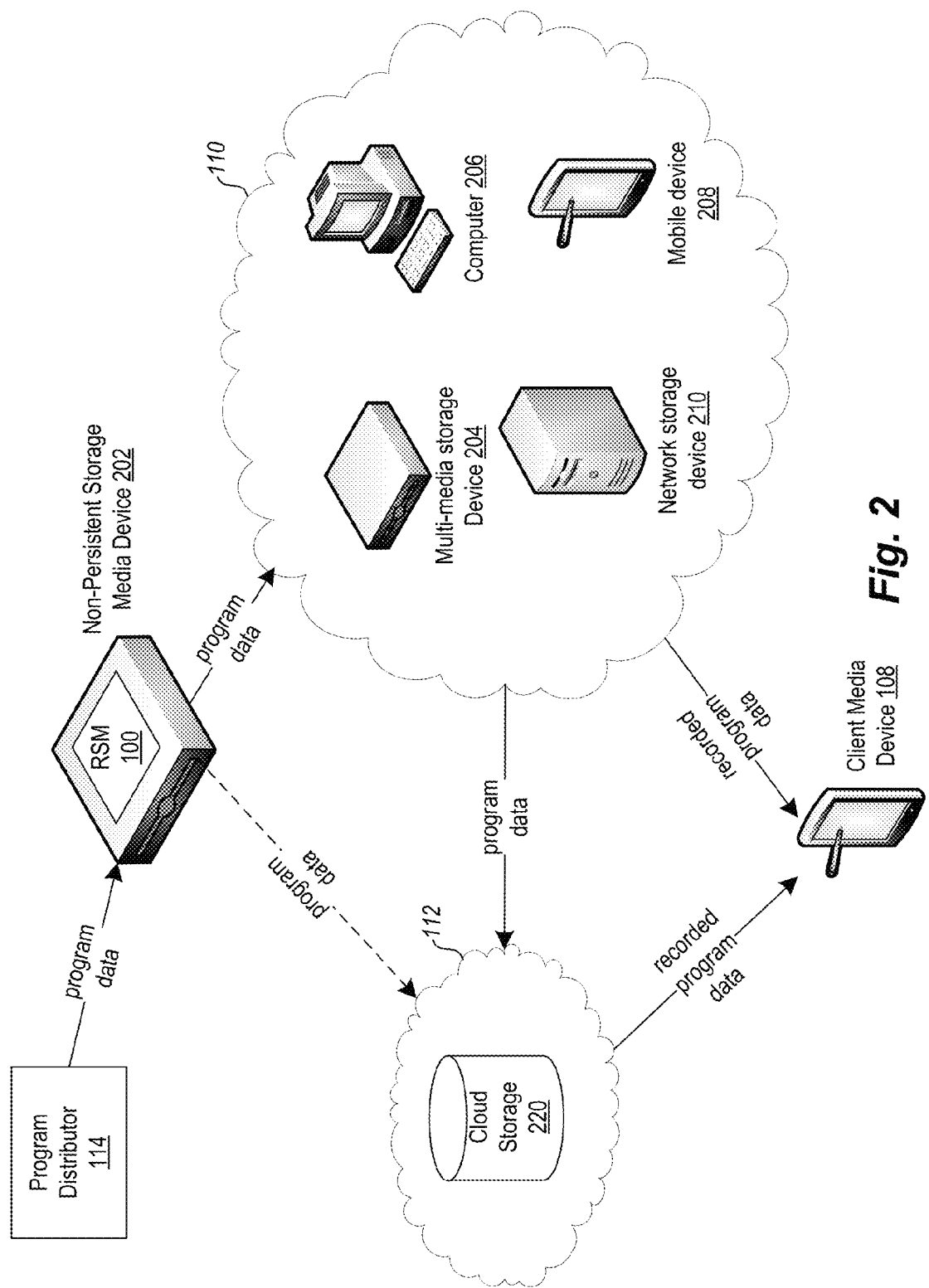
FIG. 2 is a block diagram illustrating a first example storage scenario supported by an example embodiment.

FIG. 2 is a block diagram illustrating a first example storage scenario supported by an example embodiment. In FIG. 2, the RSM 100 is shown executing on a non-persistent storage media device 202, which is an example of a media device 102. The non-persistent storage media device 202 is not itself capable of recording media content events to local storage. However, the RSM 100 facilitates the recording of received media content events on remote persistent storage devices or systems. In this example, a multimedia storage device 204, a computer 206, a mobile device 208, and a network storage device 210, all examples of persistent storage 106, are each connected to the residential network 110. Furthermore, cloud storage 220, an example of persistent storage 118, is coupled to communications system 112.

In this scenario, the RSM 100 facilitates remote recording by causing the non-persistent storage non-persistent storage media device 202 to transmit received media content events to remote persistent storage. In particular, as the non-persistent storage media device 202 receives program data (e.g., an MPEG stream) representing a media content event from the program distributor 114, the RSM 100 causes the non-persistent storage media device 202 to transmit the received program data to one of the devices or systems 204-210 on the residential network 110, where it is stored for later viewing. Also, or in addition, the non-persistent storage media device 202 may transmit received program data to the cloud storage 220 via the residential network 110. Alternatively, the non-persistent storage media device 202 can transmit the received program data directly to the cloud storage 220 without transiting the residential network 110. Later, a user operating client media device 108 can receive and view recorded program data from one of the devices 204-210 on the residential network 110 or the cloud storage 220.

In this scenario, the RSM 100 may also encrypt video data prior to its transmission to remote persistent storage. Such encryption may be part of an access control mechanism, employed to restrict access to media content events to authorized users (e.g., customers of the program distributor 114).

Figure 3:
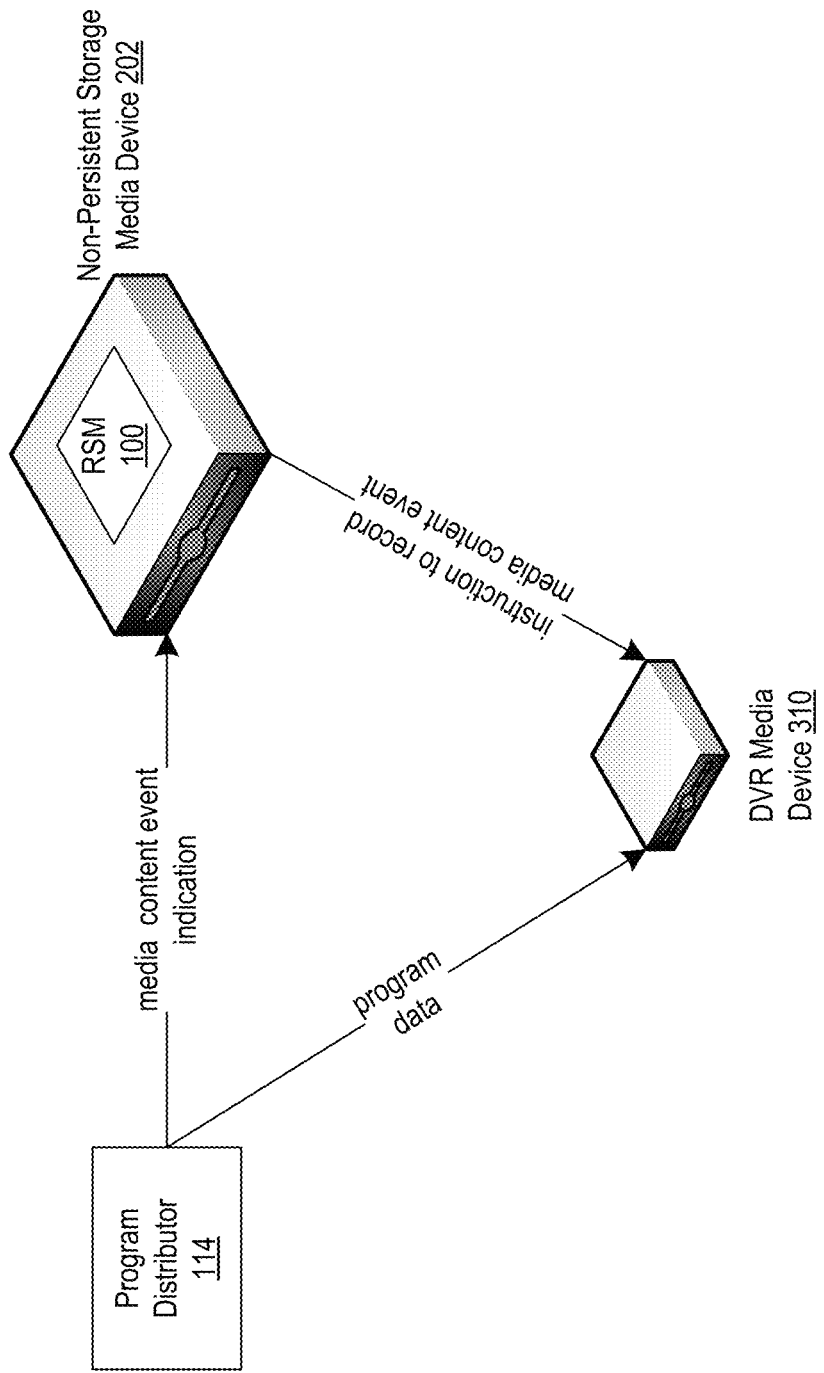
FIG. 3 is a block diagram illustrating a second example storage scenario supported by an example embodiment.

FIG. 3 is a block diagram illustrating a second example storage scenario supported by an example embodiment. In FIG. 3, the RSM 100 is again shown executing on the non-persistent storage media device 202. In this example, the RSM 100 facilitates the recording of received media content events on remote persistent storage devices, but does not itself engage in transmitting program data or other representation of such media content events to such storage devices. Rather, the RSM 100 instructs a remote persistent storage device to obtain the appropriate program data directly from the program distributor 114.

More particularly, the RSM 100 receives an indication of a media content event from the program distributor 114. Such an indication may be part of electronic program guide data or other metadata about media content events available via the program distributor 114. Then, the RSM 100 transmits an instruction to record a specified media content event to a DVR media device 310.

The DVR media device 310 is typically a media device similar to non-persistent storage media device 202 except that device 310 includes recording capabilities. For example, where the non-persistent storage media device 202 is a set-top box configured to receive (but not store) program data from a satellite broadcast network, the DVR media device 310 may be a set-top box also configured to receive media content events from the satellite network, and further configured to record such media content events on a hard disk or other storage device that is part of the DVR media device 310.

After receiving the instruction to record of the specified media content event, the DVR media device 310 initiates reception (e.g., tunes to a program signal) of program data or other representation of the media content event from the program distributor 114. Note that the program data received by the DVR media device 310 does not first transit through the non-persistent storage media device 202. By using these or similar techniques, the cost of a typical residential deployment may be lowered, in that DVR capabilities provided by one set-top box can be shared with multiple other, cheaper, non-DVR set top boxes placed in other locations throughout a home (e.g., in the bedrooms).

As noted, the storage scenarios described with reference to FIGS. 2 and 3 may in some embodiments be combined. For example, the RSM 100 may determine whether a remote persistent storage is configured to receive a media content event directly from the program distributor 114 (e.g., when the storage is part of a set-top box or other device having a tuner capable of receiving a satellite broadcast signal). If so, the RSM 100 instructs the remote persistent storage to receive the media content event directly from the program distributor 114, without being first received by the RSM 100 or its media device. If not, the RSM 100 receives and forwards the media content event to remote persistent storage, such as may be provided by one of the devices 204-210 or 310.

Figure 4:
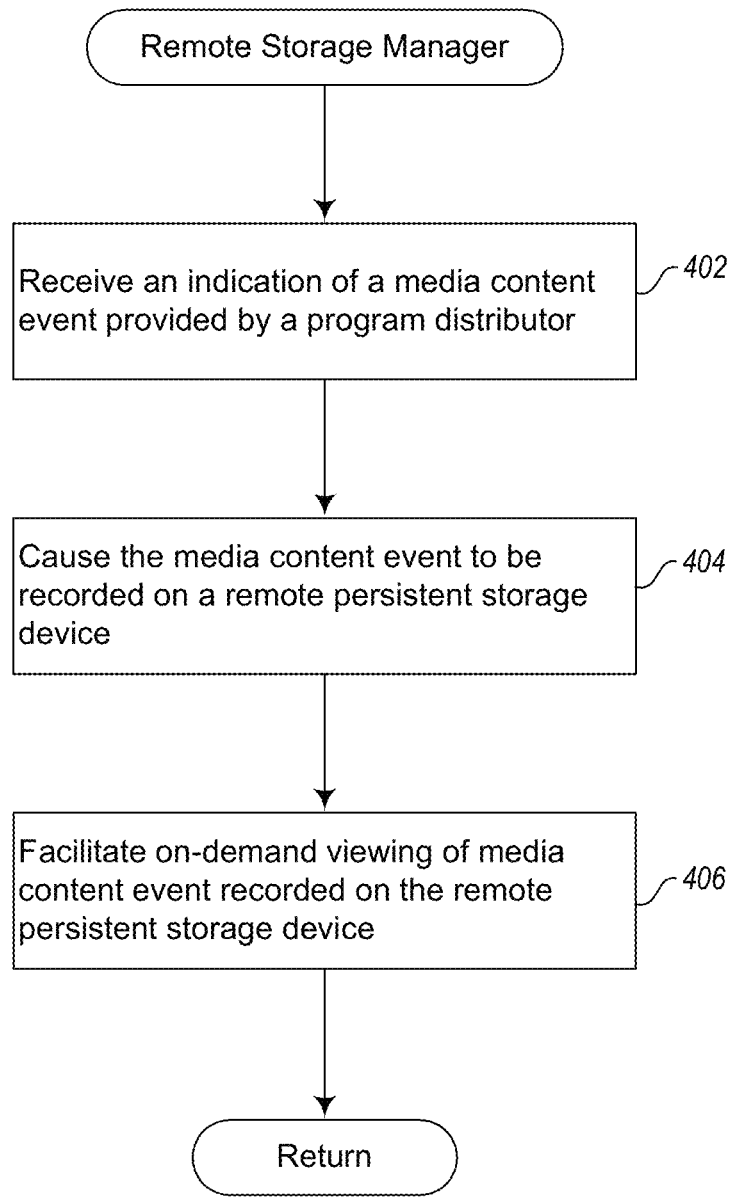
FIG. 4 is a flow diagram of a remote storage manager process provided by an example embodiment.

FIG. 4 is a flow diagram of a remote storage manager process provided by an example embodiment. The illustrated process may be provided by, for example, the RSM 100. The process facilitates recording of media content events by a media device on a persistent storage device that is remote from the media device.

The process begins at block 402, where receives an indication of a media content event provided by a program distributor. The received indication may be, for example, an instruction to record a specified media content event received by the media device.

At block 404, the process causes the media content event to be recorded on a remote persistent storage device. In one embodiment, causing the media content event to be recorded includes receiving the media content event from the program distributor, and further transmitting the received media content event to the remote persistent storage device. The remote persistent storage device may be located at or on a residential network coupled to the media device. In other cases, the remote persistent storage device may be cloud-based storage accessible via the Internet or other public network. In another embodiment, causing the media content event to be recorded includes causing the persistent storage device to obtain the media content event from the program distributor without the media content event first being received by the media device.

At block 406, the process facilitates on-demand viewing of the media content event recorded on the remote persistent storage device. In one embodiment, facilitating on-demand viewing includes receiving a request to view the media content event, obtaining (e.g., receiving from the remote persistent storage device) the media content event, and then outputting (e.g., transmitting, sending) the obtained media content event on a presentation device. In some embodiments, facilitating on-demand viewing includes receiving the media content event from the remote persistent storage device, and further transmitting the media content event to another media device. In another embodiment, facilitating on-demand viewing includes transmitting information about the location of the recorded media content event, such as by transmitting a uniform resource locator or other identifier of the remote persistent storage device. This identifier can then be used by another media device to access the recorded media content event.

Figure 5:
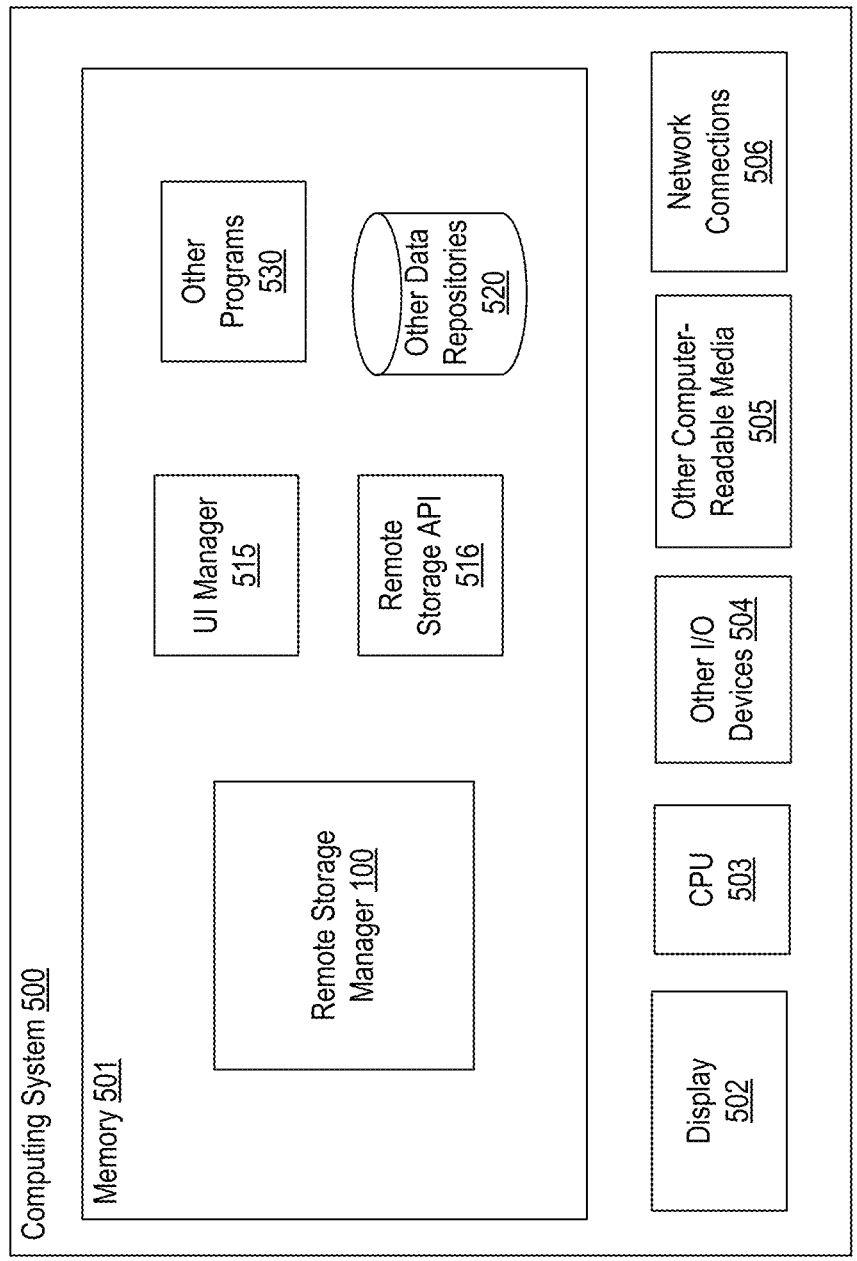
FIG. 5 is a block diagram of a computing system for practicing example embodiments of a remote storage manager.

FIG. 5 is a block diagram of a computing system for practicing example embodiments of a remote storage manager. FIG. 5 shows a computing system 500 that may be utilized to implement a remote storage manager 100. In one embodiment, the computing system 500 is part of a set-top box or other media device 102 configured to receive and display media content events on a presentation device. In other embodiments, the computing system 500 is part of a presentation device 120, such as a television.

In the embodiment shown, the computing system 500 comprises a computer memory ("memory") 501, a display 502, one or more Central Processing Units ("CPU") 503, Input/Output ("IO") devices 504 (e.g., audio processor, video processor, keyboard, mouse, CRT or LCD display cards or drivers, and the like), other computer-readable media 505, and network connections 506 (e.g., an Ethernet transceiver, a digital television tuner). The remote storage manager ("RSM") 100 is shown residing in memory 501. In other embodiments, some portion of the contents, some of, or all of the components of the RSM 100 may be stored on and/or transmitted over the other computer-readable media 505. The components of the RSM 100 preferably execute on one or more CPUs 503 and facilitate recording media content events, as described herein. Other code or programs 530 (e.g., an audio/video processing module, a program guide manager module, a Web browser or server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer-readable media 505 or a display 502.

The memory also includes a user interface manager 515 and a remote storage application program interface ("API") 516. The user interface manager 515 provides a view and a controller that facilitate user interaction with the RSM 100 and its various components. For example, the user interface manager 515 provides interactive graphical user interface elements operable by a user to configure the operation of the RSM 100.

The API 516 provides programmatic access to one or more functions of the RSM 100. For example, the API 516 may provide a programmatic interface to one or more functions of the RSM 100 that may be invoked by one of the other programs 530 or some other module. In this manner, the API 516 facilitates the development of third-party software, such as user interfaces, plug-ins, news feeds, adapters (e.g., for integrating functions of the RSM 100 into Web applications), and the like. In addition, the API 516 may be in at least some embodiments invoked or otherwise accessed via remote entities, such as code executing on a remote client device, to access various functions of the RSM 100. For example, an application on a mobile device may use the API 516 to obtain information about media content events recorded via the RSM 100.

In an example embodiment, components/modules of the RSM 100 are implemented using standard programming techniques. For example, the RSM 100 may be implemented as a "native" executable running on the CPU 503, along with one or more static or dynamic libraries. In other embodiments, the RSM 100 may be implemented as instructions processed by a virtual machine that executes as one of the other programs 530. In general, a range of programming languages known in the art may be employed for implementing such example embodiments.

In addition, the embodiments described above may also be structured in various ways, including but not limited to, multiprogramming, multithreading, client-server, or peer-to-peer, running on one or more computer systems each having one or more CPUs. Some embodiments may execute concurrently and asynchronously, and communicate using message passing, pipes, signals, or other communication techniques. Also, other functions could be implemented and/or performed by each component/module, and in different orders, and by different components/modules, yet still achieve the described techniques.

Furthermore, in some embodiments, some or all of the components of the RSM 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be non-transitorily stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be emphasized that the above-described embodiments of a remote storage manager are merely possible examples of implementations of the described techniques. Many variations and modifications may be made to the above-described embodiments. All such modifications and variations are intended to be included herein within the scope of this disclosure and protected by the following claims.

The invention claimed is:

1. A non-persistent storage set-top box, comprising:
a tuner configured to receive media content events from a program distributor;
a network interface communicatively coupled via a residential network to a persistent storage set-top box; and
logic configured to:
determine, based on whether or not the persistent storage set-top box is configured to receive media content events from the program distributor, how to cause the persistent storage set-top box to record the media content event; and
cause the persistent storage set-top box to store video data representing a media content event, by:
receiving, via the tuner, video program data representing the media content event from the program distributor; and
transmitting, via the network interface, the video program data representing the media content event from the non-persistent storage set-top box to the persistent storage set-top box where it is recorded for later viewing,
wherein the non-persistent storage set-top box is not capable of persistently storing the video program data representing the media content event, and
wherein the program distributor transmits media content events to the non-persistent storage set-top box and the persistent storage set-top box via a satellite or cable broadcast network.

2. The non-persistent storage set-top box of claim 1, wherein the logic is further configured to:
determine that the persistent storage set-top box is not configured to receive the media content event directly from the program distributor without first passing through the non-persistent storage set-top box; and
in response, receive the video program data from the program distributor and forward the received video program data to the persistent storage set-top box.

3. The non-persistent storage set-top box of claim 1, wherein the logic is further configured to:
determine that the persistent storage set-top box is configured to receive a media content event directly from the program distributor without first passing through the non-persistent storage set-top box; and
in response, instruct the persistent storage set-top box to obtain video program data representing the media content event from the program distributor.

4. The non-persistent storage set-top box of claim 1, wherein the logic is further configured to:
facilitate on-demand viewing of the media content event recorded by the persistent storage set-top box, by receiving a request to view the media content event, obtaining the media content event from the persistent storage set-top box, and outputting the obtained media content event for presentation on a presentation device coupled to the non-persistent storage set-top box.

5. The non-persistent storage set-top box of claim 1, wherein the residential network is provided at least in part over coaxial cable.

6. The non-persistent storage set-top box of claim 2, wherein the logic is further configured to:
translate the received video program data; and
forward the translated video program data to the persistent storage set-top box.

7. The non-persistent storage set-top box of claim 1, wherein transmitting the video program data includes transmitting the video program data from the non-persistent storage set-top box to the persistent storage set-top box via a coaxial cable that carries the residential network.

8. A method in a non-persistent storage set-top box, the method comprising:
determining, based on whether or not the persistent storage set-top box is configured to receive media content events from the program distributor, how to cause the persistent storage set-top box to record the media content event; and
causing the persistent storage set-top box to store video data representing a media content event, wherein the non-persistent storage set-top box includes a tuner configured to receive media content events from a program distributor and a network interface that is communicatively coupled via a residential network to the persistent storage set-top box, the causing including:
receiving, via the tuner, video program data representing the media content event from the program distributor; and
transmitting, via the network interface, the video program data representing the media content event from the non-persistent storage set-top box to the persistent storage set-top box where it is recorded for later viewing,
wherein the non-persistent storage set-top box is not capable of persistently storing the video program data representing the media content event.

9. The method of claim 8, wherein determining how to cause the persistent storage set-top box to record the media content event includes:
determining that the persistent storage set-top box is not configured to receive the media content event directly from the program distributor without first passing through the non-persistent storage set-top box; and
in response, receiving the video program data from the program distributor and forwarding the received video program data to the persistent storage set-top box.

10. The method of claim 8, wherein determining how to cause the persistent storage set-top box to record the media content event includes:
determining that the persistent storage set-top box is configured to receive a media content event directly from the program distributor without first passing through the non-persistent storage set-top box; and
in response, instructing the persistent storage set-top box to obtain video program data representing the media content event from the program distributor.

11. The method of claim 8, further comprising:
facilitating on-demand viewing of the media content event recorded by the persistent storage set-top box, by receiving a request to view the media content event, obtaining the media content event from the persistent storage set-top box, and outputting the obtained media content event for presentation on a presentation device coupled to the non-persistent storage set-top box.

12. The method of claim 8, wherein the program distributor transmits media content events to the non-persistent storage set-top box and the persistent storage set-top box via a satellite or cable broadcast network.

13. The method of claim 9, further comprising:
translating the received video program data; and
forwarding the translated video program data to the persistent storage set-top box.

14. A non-transitory computer-readable medium that includes instructions that are configured, when executed by a non-persistent storage set-top box, to perform a method comprising:
determining, based on whether or not the persistent storage set-top box is configured to receive media content events from the program distributor, how to cause the persistent storage set-top box to record the media content event; and
causing the persistent storage set-top box to store video data representing a media content event, wherein the non-persistent storage set-top box includes a tuner configured to receive media content events from a program distributor and a network interface that is communicatively coupled via a residential network to the persistent storage set-top box, the causing including:
receiving, via the tuner, video program data representing the media content event from the program distributor; and
transmitting, via the network interface, the video program data representing the media content event from the non-persistent storage set-top box to the persistent storage set-top box where it is recorded for later viewing,
wherein the non-persistent storage set-top box is not capable of persistently storing the video program data representing the media content event, and
wherein transmitting the video program data includes transmitting the video program data from the non-persistent storage set-top box to the persistent storage set-top box via a coaxial cable that carries the residential network.

15. The non-transitory computer-readable medium of claim 14, wherein the method further comprises:
determining that the persistent storage set-top box cannot receive the media content event from the program distributor without being first received by the non-persistent storage set-top box; and
in response, performing the step of causing the persistent storage set-top box to store the video data representing the media content event.

16. The non-transitory computer-readable medium of claim 14, wherein the method further comprises:
facilitating on-demand viewing of the media content event recorded by the persistent storage set-top box, by receiving a request to view the media content event, obtaining the media content event from the persistent storage set-top box, and outputting the obtained media content event for presentation on a presentation device coupled to the non-persistent storage set-top box.

17. The non-transitory computer-readable medium of claim 14, wherein the persistent storage set-top box includes a tuner configured to receive media content events from the program distributor, and wherein the method further comprises:
causing a persistent storage device to store video data representing a media content event, by receiving video program data representing the media content event, and forwarding the received video program data to the persistent storage device,
wherein the persistent storage device is distinct from the persistent storage set-top box and does not include a tuner configured to receive media content events from the program distributor.

18. The non-transitory computer-readable medium of claim 14, wherein the program distributor transmits media content events to the non-persistent storage set-top box and the persistent storage set-top box via a satellite or cable broadcast network.

* * * * *